United States Patent [19]

Christie et al.

[11] Patent Number: 5,694,463
[45] Date of Patent: Dec. 2, 1997

[54] SYSTEM FOR SERVICE CONTROL POINT ROUTING

[76] Inventors: Joseph Michael Christie, 536 Green Ave., San Bruno, Calif. 94066; Pamela Lynne Satterfield, 5213 W. 157th St., Overland Park, Kans. 66224; James David Setter, 1430 Lucy Montgomery Way, Olathe, Kans. 66061; Daniel Charles Sbisa, 2401 SW. Whispering Creek Ct., Blue Springs, Mo. 64015

[21] Appl. No.: 388,786

[22] Filed: Feb. 15, 1995

[51] Int. Cl.$^6$ .................................................. H04M 3/42
[52] U.S. Cl. .................. 379/230; 379/207; 379/221
[58] Field of Search .................................. 379/207, 221, 379/229, 230, 219, 220

[56] References Cited

U.S. PATENT DOCUMENTS

| | | | |
|---|---|---|---|
| 4,191,860 | 3/1980 | Weber | 379/115 |
| 4,611,094 | 9/1986 | Asmuth et al. | 379/201 |
| 4,893,307 | 1/1990 | McKay et al. | 370/94.1 |
| 4,979,118 | 12/1990 | Kheradpir | 364/436 |
| 5,021,949 | 6/1991 | Morten et al. | 395/200.09 |
| 5,089,954 | 2/1992 | Rago | 395/600 |
| 5,185,785 | 2/1993 | Funk et al. | 379/111 |
| 5,212,789 | 5/1993 | Rago | 395/600 |
| 5,226,075 | 7/1993 | Funk et al. | 379/243 |
| 5,237,604 | 8/1993 | Ryan | 379/207 |
| 5,241,588 | 8/1993 | Babson, III et al. | 379/201 |
| 5,282,244 | 1/1994 | Fuller et al. | 379/230 |
| 5,317,568 | 5/1994 | Bixby et al. | 370/85.6 |
| 5,323,452 | 6/1994 | Dickman et al. | 379/201 |
| 5,345,502 | 9/1994 | Rothenhöfer | 379/207 |
| 5,377,186 | 12/1994 | Wegner | 379/211 |
| 5,384,771 | 1/1995 | Isidoro et al. | 370/58.2 |
| 5,386,467 | 1/1995 | Ahmad | 379/230 |
| 5,394,463 | 2/1995 | Fischell et al. | 379/207 |
| 5,416,835 | 5/1995 | Lee | 379/207 |
| 5,425,090 | 6/1995 | Orriss | 379/230 |
| 5,448,632 | 9/1995 | Iyob et al. | 379/220 |
| 5,448,633 | 9/1995 | Jamaleddin et al. | 379/201 |
| 5,450,482 | 9/1995 | Chen et al. | 379/230 |
| 5,452,350 | 9/1995 | Reynolds et al. | 379/220 |
| 5,475,749 | 12/1995 | Akinpelu et al. | 379/207 |
| 5,519,772 | 5/1996 | Akman et al. | 379/207 |
| 5,548,639 | 8/1996 | Ogura et al. | 379/229 |

OTHER PUBLICATIONS

Briere, Daniel, "Sprint plans 'sweeping' network revisions," Network World, vol. 10, No. 38, Sep. 20, 1993, pp. 1 and 10.

*Primary Examiner*—Ahmad F. Matar
*Assistant Examiner*—Scott Wolinsky
*Attorney, Agent, or Firm*—Harley R. Ball; Michael J. Setter

[57] ABSTRACT

The present invention is a service control point (SCP) for use in a telecommunications network, and in particular, as a component of a telecommunications signaling system. The SCP includes multiple databases which allow routing plans to be stored and implemented. The SCP is operable to accept queries from switches for routing information. The SCP is further operable to reply to these queries with information identifying a connection as opposed to a routing number.

17 Claims, 4 Drawing Sheets

SYSTEM FOR SERVICE CONTROL POINT ROUTING

BACKGROUND

1. Field of the Invention

The invention relates to telecommunications, and in particular, to a system in which multiple databases are employed in a service control point (SCP) to provide switches with information identifying connections.

2. Description of the Prior Art

Telecommunications signaling systems facilitate the establishment of communication paths in a network. These signaling systems allow the network elements to exchange information regarding the routing of telecommunications traffic over the network connections. For example, the signaling system might transfer a dialed number from switch to switch so each switch on the call path can process the dialed number and select connections for the call path. A well known signaling system is Signaling System #7 (SS7).

The SCP processes signaling and is well known in the art. The SCP is typically comprised of a database system which supports the switches by providing information to the switches. An SCP is coupled to the switches over signaling links and signal transfer points which allow the SCP to exchange signaling messages with the switches. When a switch requires additional information to route a particular call, it will typically transmit a signaling message to an SCP requesting the additional information. The SCP will provide the information in a signaling message transmitted back to the switch requesting the information.

One example of SCP support is in an "800" system. In those systems, "800" number subscribers are able to define specific routing plans unique to the dialed "800" number. These routing plans are stored in an SCP, so that when a switch receives an "800" call, it must query an SCP to get access to the routing plan. The SCP will process call information in accord with the routing plan and provide the switch with a routing number that can be used to route the call. The process in which an SCP accepts an "800" number and provides a routing number is called translation. The routing number is commonly a standard telephone number, known in the art as the POTS number.

It is important to point out the difference between a routing number and a connection. Routing numbers are abstract values which are associated with routing information programmed in the switches. Digital analysis techniques are used by the switch to associate the routing number with a particular set of routing information. The routing information would indicate the connections to be made on a call. Routing numbers can be associated with connections through digital analysis and routing information in a switch, but routing numbers do not identify connections. An example being the difference between a standard telephone number and a trunk ID. Digital analysis of the telephone number coupled with routing information may direct a switch to use the trunk, but the telephone number does not identify the trunk. In fact, the routing information in a switch can be altered so that a different trunk is used for that routing number. In addition, different switches might use different trunks even though they process the same routing number. This is because the routing number is defined by each switch according to its own programming and not by a particular connection.

In contrast, connections are the actual physical media that transmit user information for the users of the network. The connections are often logically organized into channels and circuits by time, frequency, and virtual differentiations. These connections indentify entities separate from a routing number. One commonly identified connection is the switch/trunk combination. This identifies an actual switch and physical/logical media which carries user information. Thus, a clear difference between a routing number and a connection can be seen.

Another example of SCP support is with virtual networks. These systems operate similarly to "800" systems in that the SCP is called on to translate a dialed number into a routing number. In a virtual network, the subscriber is able to define both a routing plan and a numbering plan. As a result, a virtual network is logically separated from the public network. When a switch detects that a call is either originating or terminating in a virtual network, it will typically query an SCP for a routing number. This might be a POTS number or another routing number which the switch can use to route the call. The routing plan which has been defined for the virtual network typically resides in an SCP. The SCP will process call information in accord with the routing plan to provide the switch with a routing number.

As is known, switches analyze the digits in a routing number to obtain routing information indicating which connection to use on a given call. These digits are typically POTS numbers, but other routing numbers are also used. At present, SCPs have only provided the switches with routing numbers. SCPs have not identified a connection that should comprise part of the call path. As a result, the switch is still required to perform digital analysis on a routing number to discern which connection is required.

Those skilled in the art are aware of the problems posed by call processing logic residing in the switch. Changes to the routing logic must be implemented in multiple switches. This is a difficult and time consuming task. Because SCPs typically support several switches and are fewer in number, the SCPs are programmed more easily.

Because switches must actually make the connections in addition to call processing, the switches have not developed into the most efficient and flexible platforms to process information. It is beneficial to locate this processing in the more flexible and efficient SCP.

Additionally, by eliminating the routing number, less routing information needs to be stored and processed by the network. This provides additional capacity to allow more features and routing options to the customer. At present, there is a need for an SCP that can provide switches with information identifying connections for a given call.

Current systems also require that the switch be able to collect information from the caller such as authorization codes and personal identification numbers. The switch must be programmed with rules defining each type of digit collection method. When an SCP requests that a given type of digits be collected, the switch retrieves the applicable rules and collects the digits based on the rules. At present, SCPs do not define digit collection for the switches in the optimum way. Switches must be programmed to account for changes in the digit collection rules. No system exists in which basic digit collection capability is set up in the switch, and the SCP defines specific digit collection rules for the switch so that changes in digit collection can be made at the SCP and not at the switch.

SUMMARY

The present invention provides a database system which identifies a connection to use on a given call as opposed to a routing number. The present invention includes a method of operating a database system wherein a telecommunications network element transmits a first signaling message associated with a call to the database system. The method comprises receiving the first signaling message into the database system from the network element and selecting at least one connection for the call associated with the first signaling message. The method also includes generating a second signaling message identifying the connection and transmitting the second signaling message from the database system to the network element.

The database system could be a SCP and the network element could be a switch. The signaling system could be SS7. Additionally, the present invention might identify a plurality of connections for the network element.

The present invention also includes a database system for processing a first signaling message associated with a call in a telecommunications network wherein the first signaling message is transmitted from a network element to the database system. The database system comprises an interface operable to receive the first signaling message from the network element and transmit a second signaling message to the network element. The system also comprises a memory containing routing information which includes information identifying a plurality of connections, and a processor coupled to the interface and the memory operable to process the first signaling message, determine at least one connection for the call, and generate the second signaling message identifying the connection.

The database system could be an SCP and the network element could be a switch. The signaling could be in SS7 format. Additionally, the present invention might identify a plurality of connections for the network element.

The present invention also comprises an SCP wherein the SCP is linked to a switch and the switch is connected to a caller. The switch has a plurality of stored prompts playable to the caller, the caller is able to input signals to the switch, and the switch can interpret the amount of signals collected. The SCP comprises a processing means for defining a set of procedures for the collection of signals from the caller. The procedures define at least a prompt stored in the switch and an amount of digits to be collected. The SCP also comprises a generating means for generating a signaling message identifying the procedures and a transmitting means for transmitting a signaling message to the switch.

An advantage of the present invention is that the switches do not need to process a routing number after the query. This reduces the storage and processing required in the switches routing mechanism which frees up additional capacity to add more features and routing options for the caller. Also, the SCP offers a more flexible and efficient platform for implementing and modifying call processing information. Routing changes do not need to be programmed in each switch, but only to the SCPs being signaled. Because the switches must also serve as cross-connect platforms, they do not provide the advanced flexibility offered by database systems such as the SCP. SCPs are easier to develop, configure, and administer.

BRIEF DESCRIPTION OF THE DRAWINGS

Aspects and advantages of the present invention will be better understood with reference to the following drawings and description wherein:

FIG. 3 is a flow diagram of a version of the present invention.

DESCRIPTION

Figure 1:
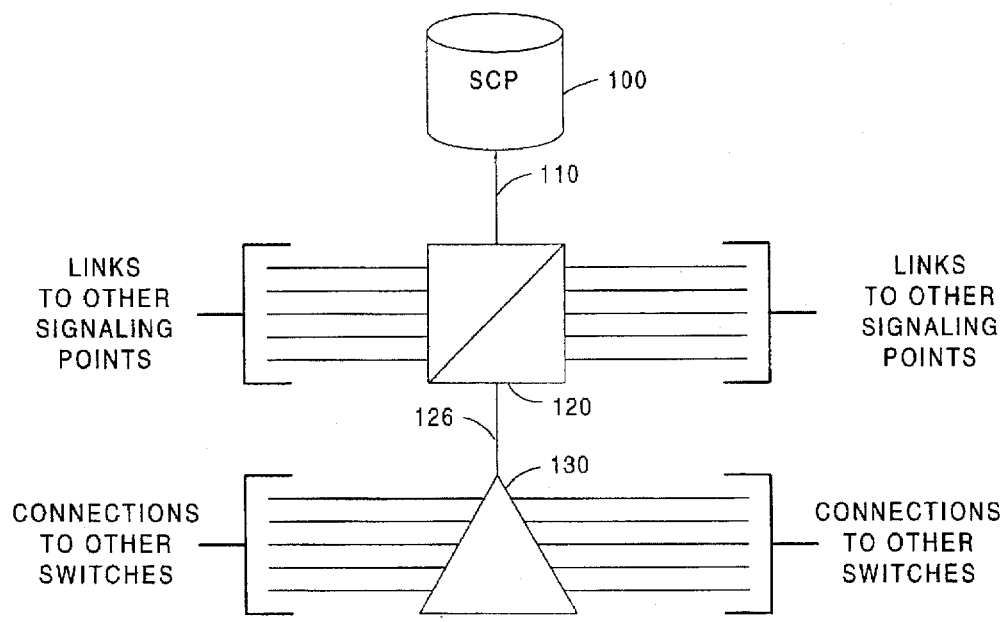
FIG. 1 is a block diagram of a version of the present invention.

A version of the present invention is depicted in FIG. 1. Service control point (SCP) 100 is shown linked to signal transfer point (STP) 120 by link 110. STP 120 is linked to switch 130 by link 126. STP 120 is also linked to other signaling points by links which are shown but not numbered. Switch 130 is connected to other switches by connections which are also shown but not numbered. Those skilled in the art are familiar with these components, links, and connections.

An SCP is well known in the art, and may includes system which receives signaling messages from a network element and uses a database to provide information to that element in the form of a reply signaling message. Network elements are the components which comprise a telecommunications network with an example being a switch. STPs route the signaling messages within the signaling system. STPs are well known in the art with an example being the DSC Megahub. A switch is any device which interconnects the various incoming connections to the switch. Switches are also well known in the art with an example being the Northern Telecom DMS-250. In accord with the present invention, switch 130 will accept a call over one of the connections, and signaling associated with the call will arrive from STP 120 over link 126. The signaling will typically be sent to STP 120 over one of the unnumbered links from another switch.

Switch 130 will process the signaling associated with the connection and will recognize that the control of the call should be transferred. This is known as a trigger. Switch 130 can be programmed to trigger based on the dialed number, the caller's number, the incoming connection, the access type, the bearer capability, the call type, the information digits, the index code, or the routing partition, but those skilled in the art are aware of other switch triggers which are equally applicable to the present invention. Examples of calls in which a switch will trigger are "800" calls, "900" calls' "500" calls and virtual network calls.

Specifically, the routing partition is a particular package of routing logic in the switch. Routing partitions are identified by codes. POTS numbers are processed in a switch by using a certain routing partition. Subscribers with their own virtual network would also have their own routing partition, and a unique routing partition code to identify their routing logic in the switch. "800" number subscribers would also have a routing partition. The switch can transmit the routing partition code associated with a call to the SCP after a trigger is encountered.

Switch 130 will trigger and send a signaling message, or query, to SCP 100. The message will be transmitted over link 126 to STP 120 and over link 110 to SCP 100. SCP 100 will analyze the information in the signaling message and transmit a reply message to switch 130. In the present invention, the reply message will identify at least one connection for the call path. Typically, a prioritized list of connections will be provided. The connection could be identified by a switch and trunk combination, but those skilled in the art are aware of other methods of identifying a connection which are equally applicable to the present invention. It should be noted that in prior systems, the SCP only replied with a single routing number which the switch had to process to identify the connections required. The difference between a connection identification and a routing number are discussed above in the Description of the Prior Art.

In the preferred embodiment, the present invention operates using SS7 messages and processing. Other systems, such as C7, TCP/IP, and X.25 are equally applicable to the present invention.

Figure 2:
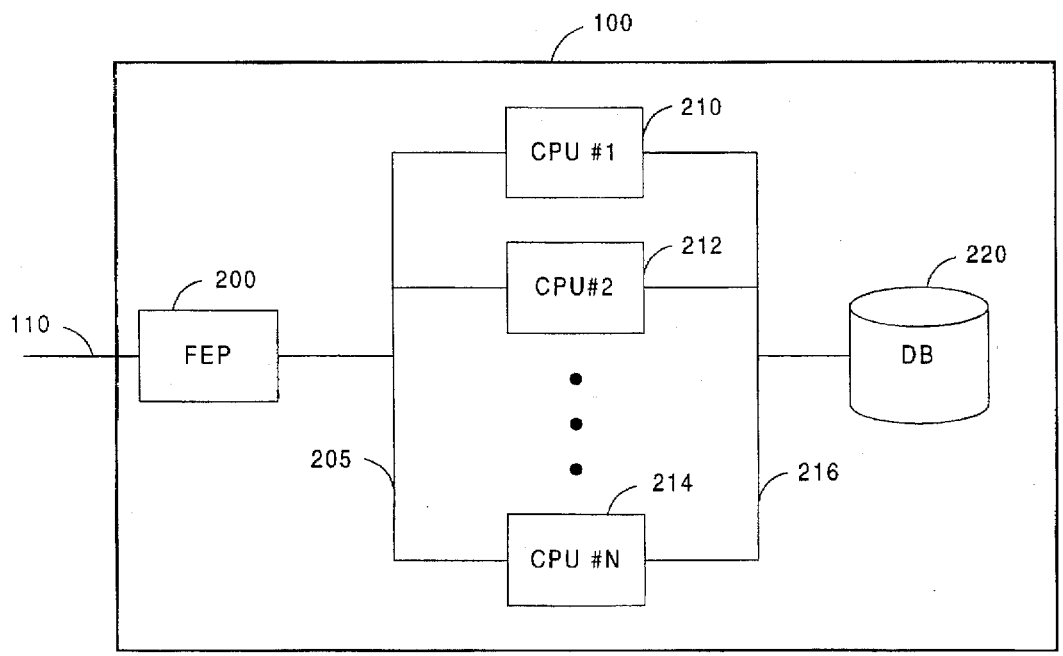
FIG. 2 is a block diagram of a version of the present invention.

FIG. 2 depicts another version of the present invention. In this embodiment SCP 100 is comprised of a front end processor (FEP), multiple central processing units (CPUs) and a Database (DB). SCP 100 and link 110 are again shown. Link 110 is commonly a 56 kbit/second data link, but other links are known and equally applicable to the present invention. Link 110 is coupled to FEP 200 which might be a Tandem ST-2000. FEP 200 is linked to multiple CPUs over link 205. Such links are well known in the art. The CPUs include CPU 210, CPU 212, and CPU 214, but as indicated, the number of CPUs may vary. The CPUs are linked to database (DB) 220 by link 216. CPU 210, CPU 212, CPU 214, link 216, DB 220, and a portion of link 205 might be housed in a Tandem Cyclone computer. Those skilled in the art are aware of other hardware and architectures which can support the functional requirements of the present invention.

FEP 200 transmits and receives signaling messages for the CPUs and provides an interface for the SCP with the SS7 network. In particular, it can apply SS7 message transfer part (MTP) and signaling connection control part (SCCP) functions to the signaling messages being exchanged with the network. Those skilled in the art are familiar with these functions.

The CPUs receive signaling messages from FEP 200 and process the information to obtain the information sought by the switch. The processing entails the use of various software including an operating system, a database management system, various utilities, and applications. The operating system could be Tandem Guardian. Those skilled in the art are aware of other operating systems and software which can support the processing called for by the present invention. Typically, the utilities will comprise communications software, processor control software, and SS7 interface software, but other utilities are possible.

FIG. 3 is a flow chart depicting the processing required by the SCP in a version of the present invention. Box 300 indicates that SS7 interface is required to accept signaling from the network. One example of the signaling messages are SS7 transaction capabilities application part (TCAP) messages which are well known in the art. TCAP messages are variable length data fields which identify information particular to a given call such as caller number (known as ANI), dialed number, calling card number, and trunk group authorization code. These numbers and other information provided by TCAP messages are known in the art. In addition, the switch can be programmed to place the routing partition code in a TCAP message.

Box 310 accepts the TCAP messages from box 300 and checks the format of the message. This entails checking that the data fields contain values and that the proper values are present. Once the TCAP message is checked, it is forwarded to box 320 for service discrimination. This is a standard SS7 interface function in which the particular service being offered is identified. Examples are "800" calls, virtual network calls, and calling card calls.

The TCAP message is then forwarded on to box 330 for customer validation. This identifies the billing mechanism for the given call. Typically, this will be the ANI, a calling card number, an authorization code, or an "800" number. Validation databases in the SCP are used to match the information in the TCAP message against a list of customer information. If a match is found, a corresponding customer record can also be retrieved from the database. The customer record includes a routing tree identification (ID). The routing tree ID is used to access a customer's particular routing plan. The routing tree ID and the TCAP message are transferred to box 340 for routing processing.

Routing processing is accomplished through the use of database structures called nodes. The nodes are identified and entered with various information, such as information in the TCAP message, the routing tree ID, and information yielded by the nodes themselves, but those skilled in the art will appreciate other possible node entries. The nodes eventually yield the connection options and service capabilities for the given call. Typically, a connection will be identified by a specific trunk and switch combination to which the call should be routed. Those skilled in the art will recognize other connection identifiers, such as virtual paths, virtual channels, and DS0 circuits. The connection identifiers are forwarded to box 350 and placed in an SS7 TCAP response message for return transmission to the switch.

The connections identified by the SCP are connections which egress from the network. These egress connections will typically be a dedicated line to a network customer, or a connection to another network that will continue to route the call. As a result, the connections identified by the SCP and given to the switch are typically not connected to that switch. The switch can be programmed to select its own connection based on this information. The programming is less complex than the digital analysis of a routing number.

In a flat network, each switch has connections to every other switch in the network. In that case, a switch/trunk combination identifies the terminating switch and the trunk which egresses from the network. The switch querying the SCP would select a direct connection to the terminating switch, and the terminating switch would select the identified trunk. It should be noted that the SCP of the present invention still may retain the capability to return a routing number to the switch if routing numbers are desired for given call scenarios.

Those skilled in the art are aware of the modifications required to alter a switch, such as the Northern Telecom DMS-250, so that it triggers based on specific call attributes such as the routing partition, transmits the attributes in the TCAP message, and switches based on the connection options identified in the reply TCAP message.

Figure 4:
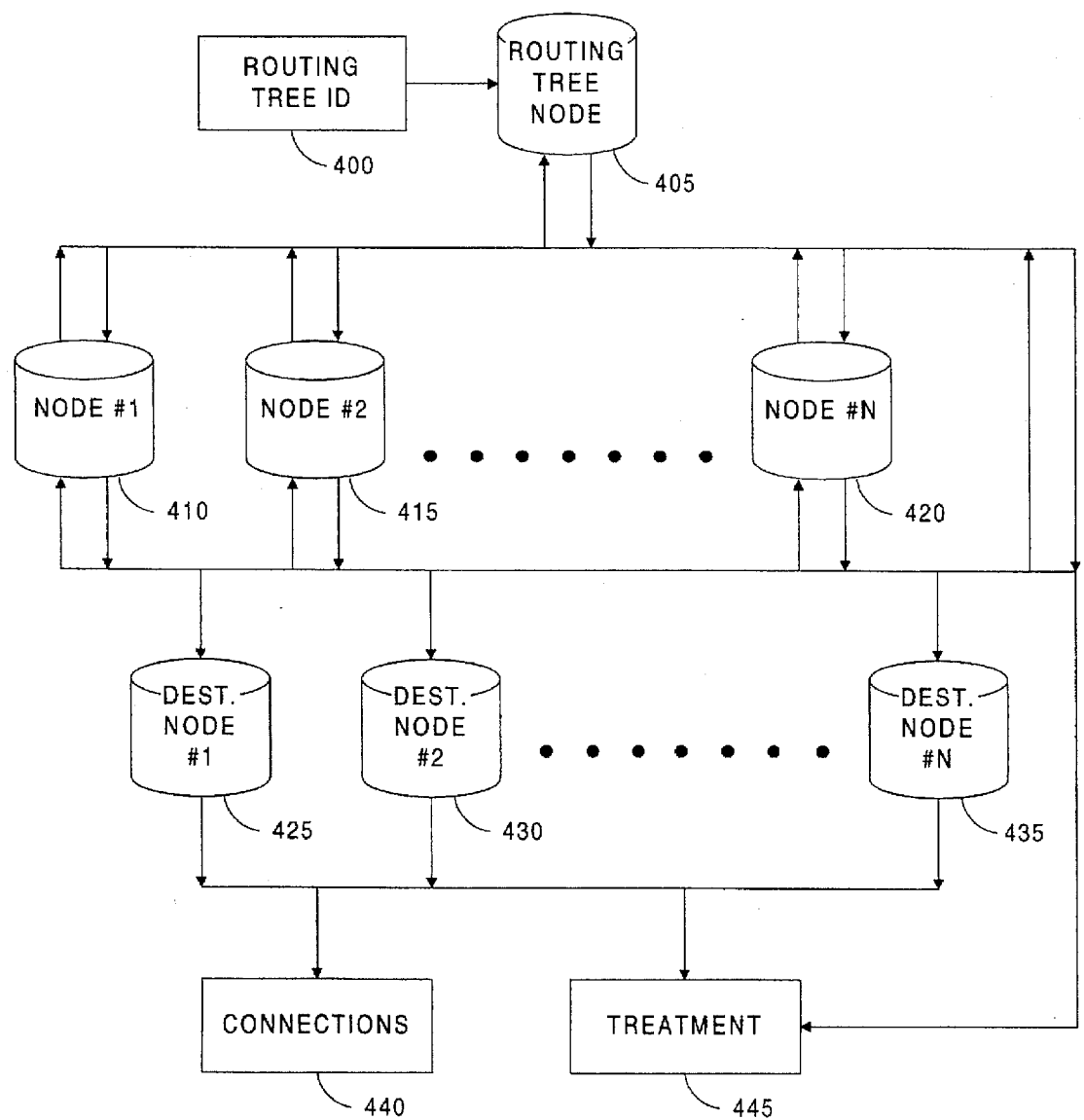
FIG. 4 is a logic diagram of a version of the present invention.

FIG. 4 depicts a preferred logical structure of the routing function of the present invention. The structure is comprised of nodes which are data structures. These data structures form tables which can be entered with particular criteria and yield a pre-determined result. Typically, a node is entered with data and yields the next node which should continue the call processing. For example, a date node might be entered with November 22 and yield a time node that should continue to process calls made on November 22. The time node might be entered with 4:00 A.M. and yield the next node to continue processing calls placed at 4:00 A.M.

Routing tree ID 400 is shown and represents information from the customer validation function that is delivered to the routing function. Also shown are node 405, node 410, node 415, node 420, node 425, node 430, and node 435. As shown on the drawing, the number of nodes may vary, and the arrows indicate that the nodes have access to each other.

Connections 440 is shown and represents information identifying connections for the call. Treatment 445 is shown and represents instructions for handling a call when no connections are obtained or used. Examples of treatment would be to play a message to the caller or to route the caller to a live operator.

Routing tree ID 400 will be used to enter routing tree node 405 which will yield information identifying another node or routing tree. The identified node or tree is then entered which yields other nodes or trees. Thus, the processing proceeds from node to node and tree to tree in this fashion.

Node 405 is the routing tree node and used to access the different routing trees. Nodes 410, 415, and 420 are decision nodes which process calls within the routing trees, but do not identify call connections. Nodes 425, 430, and 435 are destination nodes which yield a prioritized list of connections for given calls. Each node can use its data structure to identify particular characteristics, such as a time of day or a caller's country code, and provide call processing which is specific to these characteristics. By configuring the nodes with different routing criteria, a routing plan can be formulated and implemented through the nodes. Typically, a list of prioritized connections is provided by the SCP to the switch.

Figure 5:
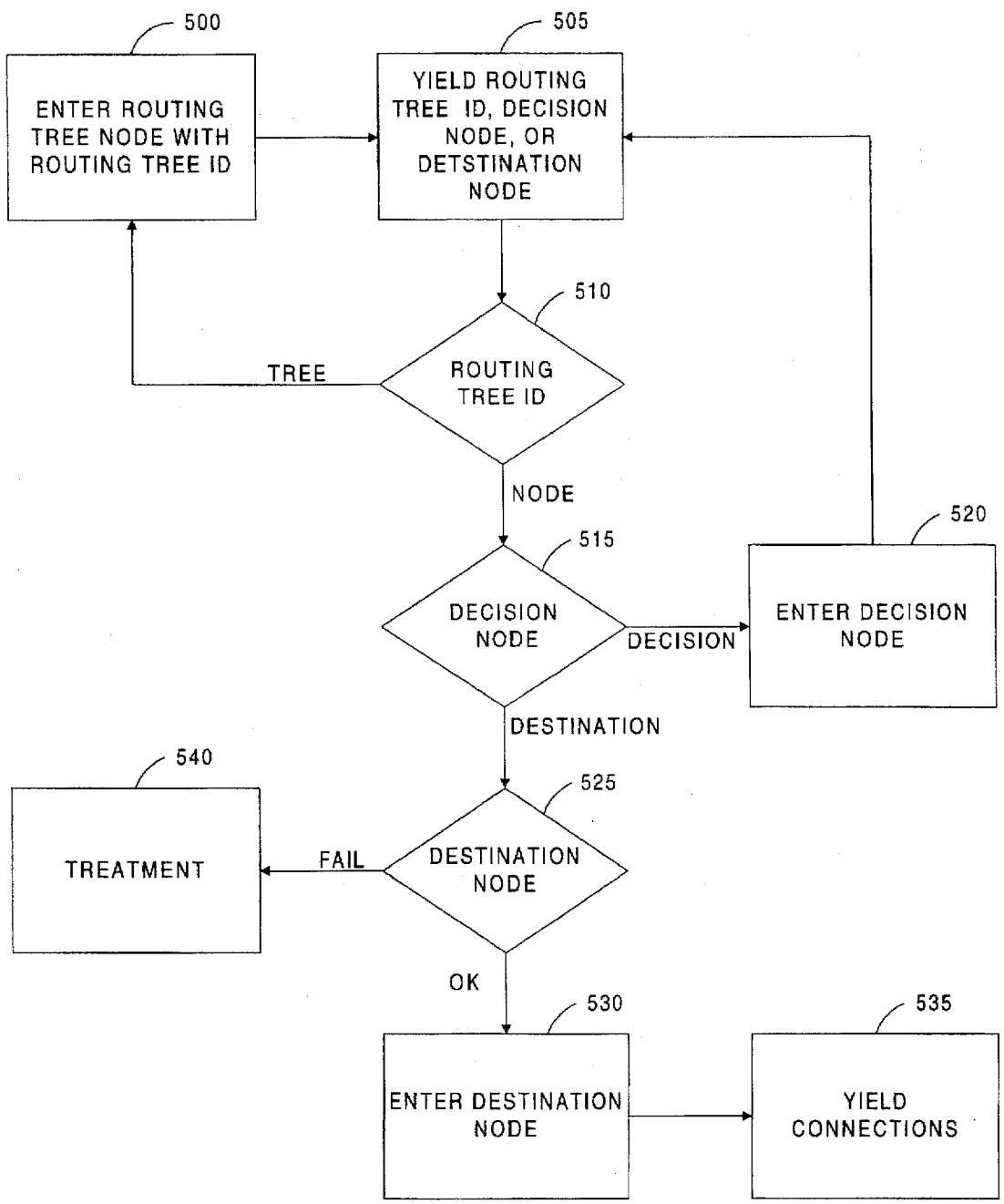
FIG. 5 is a flow diagram of a version of the present invention.
Figure 4B:
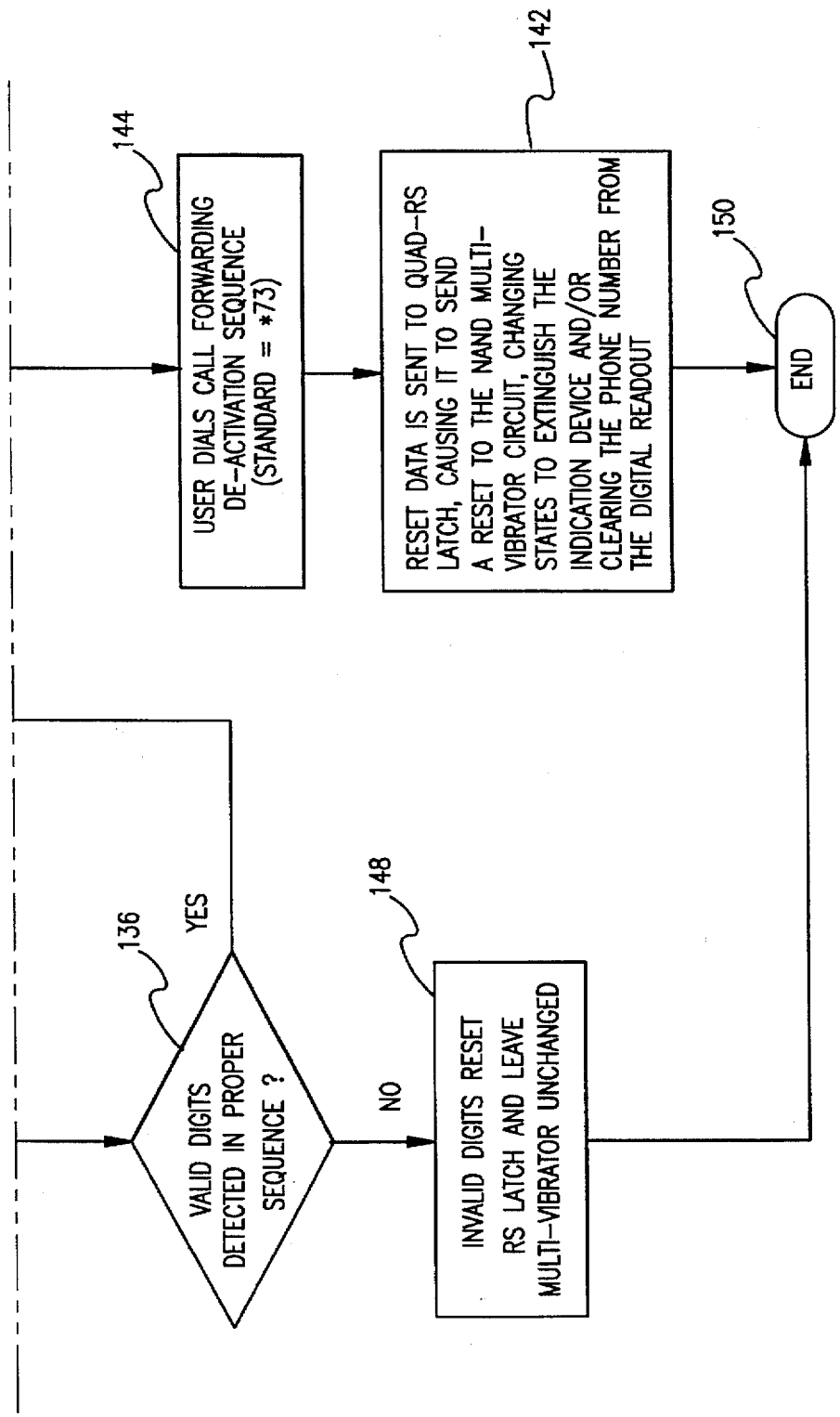

FIG. 5 illustrates the logical flow for the routing function of a version of the invention. Box 500 shows that the routing tree node is entered with the routing tree ID. This yields a routing tree ID, a decision node, or a destination node as depicted in box 505. Diamonds 510, 515, and 525 illustrate that processing is continued based on the yield. Diamond 510 shows that the routing tree node could be re-entered at box 500. Diamond 515 shows that a decision node could be entered at box 520. The decision node would yield a result as indicated in box 505, and the above processing would repeat. Diamond 525 shows that a destination node could be entered at box 530 and yield connections at box 535. Once the connections are yielded, the SCP routing function can provide the information to the switch in the form of a reply TCAP message.

Should the above processing fail, box 540 indicates that treatment would be performed on the call. Throughout the processing, back-up nodes and trees could be identified by any given yield in addition to the primary node or tree. Thus, if the primary node or tree was unavailable, the back-up node or tree could be used to continue the processing. In addition, a global routing tree exists in the logical routing structure. All nodes can point to the global tree, and the global tree should be configured to handle the yield of any of the nodes, or at least pick-up the processing at that point. The global tree can be used as a default tree in case a given routing tree cannot process the call.

As discussed, the nodes comprise data structures which can be entered with various criteria and which yield other nodes or trees to further the processing. If a node is yielded, the actual line of the node which should be entered may be given for additional granularity. One node is the routing tree node which is entered with the routing tree ID and which yields a node or another routing tree ID.

Another node is a dialed number node. These nodes are entered with the dialed number. The dialed number node is configured to correspond entries to given ranges of possible dialed numbers. For example, the dialed number node in a given routing tree might include a range for the numbers 123-0000 through 123-3333 and another range for 123-3334 through 123-9999. Any number entry within a given range would receive the same yield. These nodes yield node or tree IDs.

Since dialed numbers vary in length, filler digits are added at the beginning of the dialed numbers so each dialed number has 16 digits. For example, a dialed number of 9876 would be lengthened to 16 digits by adding 12 filler digits (represented by an x) to get xxxxxxxxxxxx9876. In this way, each dialed number field is 16 digits long and no field demarkation is required. Filler digits are ignored during subsequent processing.

The yield of the dialed number node can add additional digit manipulation by deleting digits or adding digits to the dialed number. For example, an area code may be added to particular dialed numbers even if the area code was not dialed. In this way a dialed number information service (DNIS) can provide the number specified by the dialed number node instead of the actual dialed number.

Another node is a point of origin node. The point of origin nodes could be entered by NPA, NPA-NXX, ANI, country code or other indication of the caller's origin. These nodes yield node or tree IDs.

Another node is the time node. Time nodes could be entered with the actual time, the day of the week, or the date. Separate time nodes could act on all three criteria. These nodes yield node or tree IDs.

Another node is the information digit node. The information digits are a TCAP data field that identifies the type of telephone used. These nodes yield node or tree IDs.

Another node is the allocation node. The allocation node could be used to separate call traffic based on percentage. For a given allocation node, 10% of the entries might get a particular yield, 20% might get another, and the remaining 70% might get a third yield. This node could be used to distribute calls proportionally among multiple destinations. These nodes yield node or tree IDs.

Another node is the remote site node. These nodes could be used to generate queries to an external data base and receive the response. These nodes yield node or tree IDs in addition to data collection.

Another node is the destination node. Typically multiple destination nodes are provided to enhance the number of connection options. A destination node contains a list of connections in a prioritized order. The connections might be identified by trunk and switch combination, DS0 circuit, or virtual connection. Those skilled in the art are aware of other identifications for a connection.

The destination node can return multiple connection options to the switch. The switch will sequentially attempt to route the call based on each connection. The switch must be programmed to act on the list of connections it receives. As discussed, switches typically route based on a routing number and are not currently configured to receive and process a connection identifier in a TCAP message. Those skilled in the art are aware of how a switch could be programmed to accommodate the present invention.

Should the switch be unable to connect based on one of the connections identified, the switch can re-query the SCP. By using the transaction identification in the TCAP message, the service discrimination function of the SCP can associate this second query with the first query. The service discrimination function can then forward the message directly to the point in which processing on the first query ended. This would be at a destination node. The sequence number of the TCAP message could then be used to determine that this is the second query, and the next highest priority group of connection options that were not sent in the first reply can be sent in the second reply message. This procedure can be repeated between the switch and the SCP until the a connection is made or until the list of connections is exhausted.

For "800" calls, one embodiment of a version of the present invention could operate as follows. The "800" call would be routed from the local exchange carrier (LEC) accepting the call to the interexchange carrier (IXC) administering the dialed "800" number. The originating switch of the IXC would trigger when it identified the routing partition for the "800" call. As a result, a TCAP message including the routing partition code and general TCAP information would be sent to an SCP. The SCP would identify the customer based on the routing partition code and obtain the customer's routing tree ID associated with the routing partition code. The SCP would then use the routing tree ID to enter the nodes.

Node processing might entail the use of several nodes to account for the dialed number, time of day, percentage allocation, and destination priority. For this example, assume the call was made to 800-123-3333 at 3:00 P.M. The routing tree node might be entered with the routing tree ID and yield dialed number node "WW". Dialed number node "WW" might direct all dialed numbers between 800-123-0000 and 800-123-5555 to time of day node "XX". Time of day node "XX" might direct all calls between 8:00 A.M. and 5:00 P.M. to line 12 of allocation node "YY". Line 12 of allocation node "YY" could split the calls in a 50/50 fashion between two destinations and implement this with a yield to destination node "ZZ". Destination node "ZZ" could comprise a list of trunk and switch combinations in the order they should be used. The first choice might a dedicated connection to the customer. The second choice might be a switched connection to a LEC for delivery to the customer. The SCP would reply with a TCAP message identifying a list of trunk and switch combinations for the call. The originating switch would then make a connection to the switch identified in the TCAP reply message and signal that switch. The identified switch would then connect to the destination over the identified trunk. If that connection was not available, subsequent connections would be attempted in the order listed. The SCP could also be re-queried for additional connection options.

The present invention could also be applied to a virtual network in a similar fashion. Those skilled in the art also appreciate other applications for the present inventions to situations where a database responds to a switch query with a routing number.

In another embodiment of the present invention, the SCP is configured to collect information from the caller to facilitate processing at the SCP. This information can be input by the caller through dual tone multi-frequency input (DTMF). Examples of such information are account codes, authorization codes, addresses, and personal identification numbers (PINs). Should the SCP encounter a node which calls for information to be provided by the caller, a signaling message is generated and transmitted to the switch based on the yield of the node.

The message contains the transaction code, the prompt ID, the minimum digits, the maximum digits, the type of digits, the interdigit time, and appending information. The switch associates the transaction code with the pending call and plays the prompt to the caller which is identified in the message. The switch then collects the number of digits in the range specified in the message and uses the interdigit timing information to provide a window to the caller in which to input each DTMF signal. The switch also and converts the DTMF tones into digital information. The digit type in the message might indicate if a PIN, an account code, or even if generic digits are being collected. The switch also appends the appending information to the digits collected from the caller. This might add a prefix or suffix to the input, and is primarily for the switches own records. After collection, the switch sends a message to the SCP with the transaction code the digit type and the digits themselves. Multiple messages can be sent to the switch with corresponding prompts being played to the caller. The digit type would be used to identify which input is being collected for a given transaction code.

Those skilled in the art are aware of how a switch could be configured to support this embodiment. The switch would have voice prompts stored at identified locations and would be able to locate and play the prompt. The switch would have a DTMF decoder that could collect and convert the DTMF input based on the range of expected digits and the interdigit timer. The switch would also be able to append information to the input and send a response message to the SCP with the digits.

By providing the SCP with this capability, digit collection rules can be defined and implemented by the SCP instead of the switch. In keeping with the other embodiments of the present invention, this allows a more flexible call processing environment since the SCP can be programmed more easily. Once the switch is initially configured to collect digits based on the rules in the messages, digit collection can be added, changed, and deleted at the SCP without any change to the switch.

A primary advantage of the present invention is that the switches do not need to process a routing number after the query. This reduces the storage and processing required in the switches routing mechanism which frees up additional capacity to add more features and routing options for the caller. Also, the SCP offers a more flexible and efficient platform for implementing and modifying call processing information. Routing changes do not need to be programmed in each switch, but only to the SCPs being signaled. Because the switches must also serve as cross-connect platforms, they do not provide the advanced flexibility offered by database systems such as the SCP. SCPs are easier to develop, configure, and administer.

Those skilled in the art will appreciate the teachings of the present invention and understand many variations which are applicable to the present invention. The present invention is not restricted to only the variations disclosed herein, and the scope of the invention should be measured by the following claims.

What is claimed is:

1. A method of operating a database system wherein a telecommunications network element transmits a first signaling message associated with a call to the database system, the method comprising:
   receiving the first signaling message into the database system from the network element;
   selecting a plurality of alternative call path connections for the call associated with the first signaling message;
   generating a second signaling message identifying the alternative call path connections; and
   transmitting the second signaling message from the database system to the network element.

2. The method of claim 1 wherein the network element is a switch.

3. The method of claim 1 wherein the database system is a Service Control Point (SCP).

4. The method of claim 1 wherein the first and second signaling messages are in Signaling System #7 (SS7) format.

5. The method of claim 1 wherein the call is an "800" call.

6. The method of claim 1 wherein the call is a virtual network call.

7. The method of claim 1 wherein at least one of the alternative call path connections is a trunk and switch combination.

8. The method of claim 1 wherein at least one of the alternative call path connections is a DS0 circuit.

9. The method of claim 1 wherein at least one of the alternative call path connections is a virtual circuit.

10. A database system for processing a first signaling message associated with a call in a telecommunications network wherein the first signaling message is transmitted from a network element to the database system, the database system comprising:

an interface operable to receive the first signaling message from the network element and transmit a second signaling message to the network element;

a memory containing routing information which includes information identifying a plurality of connections; and a processor coupled to the interface and the memory operable to process the first signaling message, determine a plurality of alternative path connections for the call, and generate the second signaling message identifying the alternative call path connections.

11. The system of claim 10 wherein the network element is a switch.

12. The system of claim 10 wherein the database system is a Service Control Point (SCP).

13. The system of claim 10 wherein the first and second signaling messages are in Signaling System #7 (SS7) format.

14. The system of claim 10 wherein the routing information is comprised of a routing tree node, a plurality of decision nodes, and a plurality of destination nodes.

15. The system of claim 14 wherein the decision nodes are comprised of at least a point of origin node, a time node, and a dialed number node.

16. The system of claim 14 wherein the destination nodes can yield a plurality of prioritized connections for the call.

17. A Service Control Point (SCP) for processing a first Transaction Capabilities Application Part (TCAP) signaling message associated with a call in a telecommunications network, wherein a switch transmits the first TCAP signaling message to the SCP, the SCP comprising:

an interface means for receiving the first TCAP signaling message from the switch and for transmitting a second TCAP signaling message to the switch;

a signaling means for applying Signaling System #7 (SS7) processing to the first and second TCAP signaling messages; and a processing means for determining a prioritized list of alternative path connections for the call associated with the first TCAP signaling message and for generating the second TCAP signaling message wherein the second TCAP signaling message identifies the alternative call path connections.

* * * * *